United States Patent
Tangiku et al.

[11] Patent Number: 6,071,582
[45] Date of Patent: Jun. 6, 2000

[54] RUBBER LAYER STRUCTURE

[75] Inventors: Koichi Tangiku; Atsushi Suzuki; Masayoshi Ichikawa, all of Aichi, Japan

[73] Assignee: Toyoda Gosei Co., Ltd., Aichi, Japan

[21] Appl. No.: 08/998,483

[22] Filed: Dec. 29, 1997

[30] Foreign Application Priority Data

Dec. 25, 1996 [JP] Japan .................................. 8-346317

[51] Int. Cl.[7] .................................................. B29D 22/00
[52] U.S. Cl. .................. 428/36.91; 428/36.8; 428/476.3; 428/476.9; 428/509; 428/515; 428/519; 428/521; 525/331.7; 525/331.8; 525/332.6; 525/387; 525/343
[58] Field of Search .......................... 525/331.7, 331.8, 525/332.6, 387, 343; 428/36.8, 36.91, 509, 476.3, 476.9, 515, 519, 521

[56] References Cited

U.S. PATENT DOCUMENTS 3,407,158  10/1968  Guglielmino et al. ............. 525/331.8
4,983,685   1/1991  Aoshima et al. ................... 525/331.8

FOREIGN PATENT DOCUMENTS 5-278165  10/1993  Japan .

*Primary Examiner*—William Krynski
*Assistant Examiner*—Chris Cronin
*Attorney, Agent, or Firm*—Pillsbury Madison & Sutro

[57] ABSTRACT

A rubber layer structure provided with a first rubber layer having a first liquid facing surface for contact with a liquid surface and a second rubber layer in contact with a second surface of the first rubber layer. The first rubber layer is formed of a peroxide vulcanization first rubber compound which mainly comprises EPDM, contains sulfur powder as a co-crosslinking agent and does not contain a zinc compound. The second rubber layer is formed of a sulfur vulcanization second rubber compound which mainly comprises EPDM and contains a zinc compound. The first rubber layer and the second rubber layer are adhered together by vulcanization.

21 Claims, 2 Drawing Sheets

RUBBER LAYER STRUCTURE

BACKGROUND OF THE INVENTION

1. Field of the Invention

The present invention relates to a rubber layer structure provided with a first rubber layer having a first liquid facing surface for contact with a liquid surface and a second rubber layer in direct contact with a second surface of the first rubber layer. In particular, the present invention relates to a rubber layer structure suitable for a water hose in an automobile and the like.

The following is a description of a rubber layer structure with reference to a water hose (reinforced hose) H1 principally formed of an inner tube (first rubber layer) 11, a reinforcing yarn layer 13 and an outer tube (second rubber layer) 15 as an example (See FIG. 1). The present invention is not limited to this structure, but can also be applied to a reinforced hose H2 having an inner tube 11 formed of two layers 11a and 11b, a double-layered rubber hose H3 formed of an inner tube 11 and an outer tube 15 without a reinforcing yarn layer 13 as illustrated in FIGS. 2 and 3, respectively, and a diaphragm D having a reinforcing yarn layer 13A sandwiched between a first rubber layer 11A and a second rubber layer 15A as illustrated in FIG. 4.

The abbreviation for the rubber polymer used herein is EPDM: ethylene-propylene-diene copolymer rubber.

Units of a mixture in the following description are based on weight unless otherwise specified.

2. Description of the Related Art

As a water hose, there exists, for example, a water hose formed of, as illustrated in FIG. 5, an inner tube 51, a reinforcing yarn layer 53 which is in contact with the outer periphery of the inner tube 51 and has a mesh structure, which is made by a spiralling machine or braiding machine and an outer tube 55. In this water hose, the inner and outer tubes 51 and 55 are adhered to each other through the meshes of the reinforcing yarn layer 53. Both of the inner tube 51 and the outer tube 55 are generally formed of EPDM compounds containing either sulfur (sulfur vulcanization EPDM compound) or peroxide (peroxide vulcanization EPDM compound) so that they can be adhered by vulcanization to each other through the meshes of the reinforcing yarn layer 53. In other words, the sulfur vulcanization EPDM compound and the peroxide vulcanization EPDM compound are not adhered directly to each other. The reinforcing yarn layer 53 is formed of 66-nylon yarn (polyamide fibers), Aramid fibers, rayon fibers or the like.

A long life coolant (LLC), which is an agent mainly including a glycol, has generally been added to cooling water which passes through the water hose.

When cooling water containing a specific LLC therein is used, a metallic component in the rubber hose (particularly a zinc component) elutes from the rubber. The elution of the zinc component is undesirable because the zinc component reacts with an acid component in the LLC and forms a precipitating salt.

Accordingly, there is a need for a blending formation inevitably used of a rubber compound that is free of a zinc compound for at least an inner tube.

In sulfur vulcanization rubber compounds, zinc oxidant is inevitably used as a vulcanization activator.

Vulcanization agents, which mainly include an active sulfur emitting type organic vulcanization agent (which will hereinafter be called "organic vulcanization agent") and in addition, contain a small amount of sulfur powder, are used and sulfur emission of the organic vulcanization agent cannot be conducted without the existence of a zinc oxidant as a vulcanization activator resulting in insufficient vulcanization. The organic vulcanization agent is used in order to avoid sulfur bloom or scorch which appears when sulfur powder is used and it also improves the aging resistance.

If the EPDM compound is a peroxide vulcanization compound, zinc oxidant is not always necessary; in other words, the composition may be free of zinc oxidant. In this situation, it was, however, also necessary to use a peroxide vulcanization compound for the outer tube for purposes of vulcanization adhesion. However, it is very expensive to form both the inner tube and the outer tube from a peroxide vulcanization compound.

Further, when cooling water is introduced into a water hose or the like, electricity tends to move through connecting parts such as a mounting bracket, the waterhose and the like. This problem is attributed to a recent increase in the installation ratio of electron-related parts in automobiles. When an electrolytic liquid such as a cooling water is passed through a water hose or the like, a slight amount of electricity passes through the rubber compound because it contains a large amount of carbon black having a low volume intrinsic resistivity. The introduction of electricity into the water hose or the like is undesirable because it accelerates electrochemical reaction between a hose and an electrolytic liquid (cooling water).

SUMMARY OF THE INVENTION

With the forgoing in view, a first object of the present invention is to provide a rubber layer structure with a second rubber layer adhered to a first rubber layer by vulcanization wherein the second rubber layer is made out of a sulfur vulcanization compound, and the first rubber layer for contact with a liquid surface is made out of a peroxide vulcanization EPDM compound.

A second object of the present invention is to provide a rubber layer structure through which electricity is not easily introduced because of a high intrinsic resistivity in the rubber layer. This property is useful when the rubber layer structure is a water hose or the like and an electrolytic liquid is passed therethrough.

According to the present invention, there is provided a rubber layer structure comprising: a first rubber layer having a liquid facing inner surface, the first rubber layer comprising a first rubber compound which is a peroxide vulcanization compound, the first rubber compound including EPDM and sulfur as a co-crosslinking agent and not including a zinc compound; and a second rubber layer being in contact with an outer periphery of the first rubber layer, the second rubber layer comprising a second rubber compound which is a sulfur vulcanization compound, the second rubber compound including EPDM and a zinc compound, and the first rubber layer and the second rubber layer being adhered by vulcanization.

In the above rubber layer structure, the first rubber compound further may include (a) carbon black as a reinforcing inorganic filler, (b) calcium carbonate and (c) a talc having an average particle size of about 1 to 5 $\mu$m and an aspect ratio of about 5 to 20.

Further, a portion of the carbon black may be replaced by the calcium carbonate and talc.

DETAILED DESCRIPTION OF THE PREFERRED EMBODIMENTS

The present invention will hereinafter be described in more detail.

Figure 1:
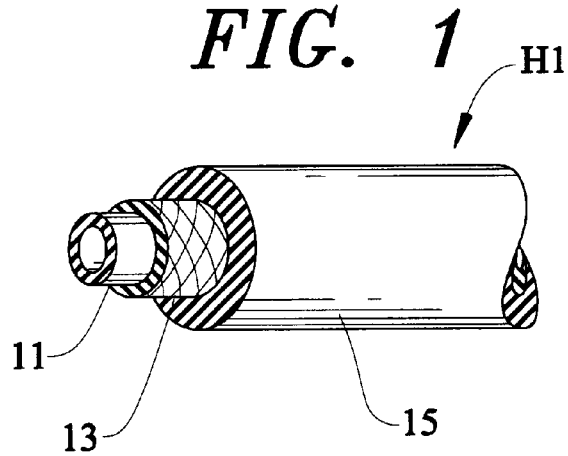
FIG. 1 is a partial perspective view illustrating one embodiment of a reinforced rubber hose of the present invention.
Figure 2:
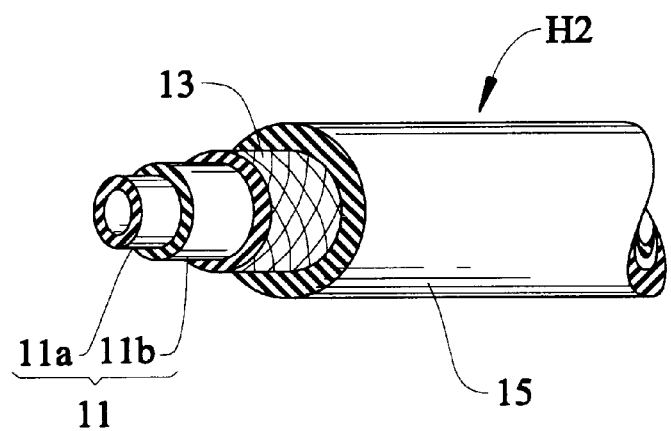
FIG. 2 is a partial perspective view illustrating another embodiment of the invention.
Figure 3:
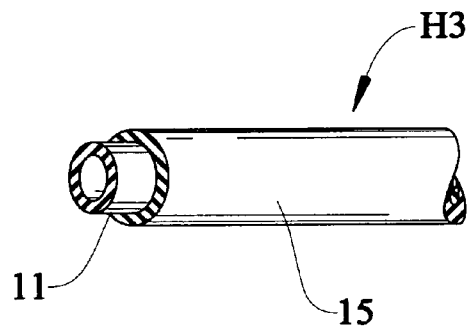
FIG. 3 is a partial perspective view illustrating another embodiment of a double-layered rubber hose of the present invention.
Figure 4:
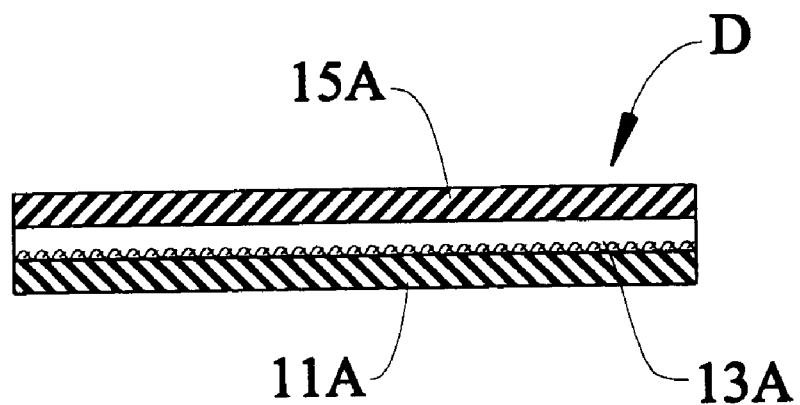
FIG. 4 is a cross-sectional view illustrating a diaphragm of the present invention.
Figure 5:
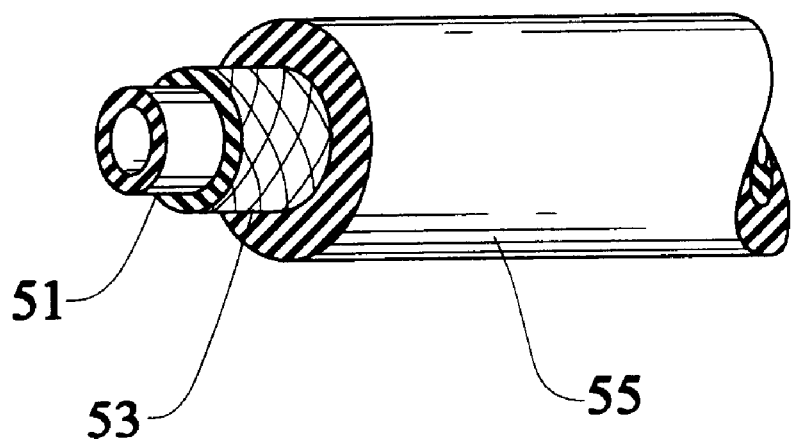
FIG. 5 is a partial perspective view illustrating a prior art water hose.

One embodiment of the rubber layer structure of the present invention is a rubber hose (water hose) as illustrated in FIG. 1 having an inner tube 11, a reinforcing yarn layer 13 which is in contact with the outer periphery of the inner tube 11 and has a mesh structure, and an outer tube 15. The inner tube 11 and outer tube 15 are both formed of an EPDM compound and they are adhered together by vulcanization. The reinforcing yarn layer 13 is formed of 66-nylon (polyamide fibers), Aramid fibers, rayon fibers or the like.

The wall thickness of the inner tube 11, reinforcing yarn layer 13 and outer tube 15 are generally 0.3 mm to 0.7 mm, 0.9 mm to 1.3 mm and 1.4 to 1.8 mm, respectively.

For purposes of the invention, general-purpose EPDM can be employed as EPDM and generally, EPDM having a propylene content of 30 to 50 wt %, an iodine value of 10 to 40 and a Mooney viscosity ($ML_{1+4}$ 100° C.) of 50 to 200 is suitable. Ethylidene norbornene and dicyclopentadiene are examples of suitable dienes.

Incidentally, the reinforcing yarn layer 13 is formed of 66-nylon (polyamide fibers) and has a knitting angle generally set at 50 to 60°. When knitting angles are too small, it is difficult to secure an area effective for vulcanization adhesion. Too large of knitting angles make it difficult to bring about reinforcing effects.

In the above example, the EPDM compound (first rubber compound) forming the first rubber layer is a peroxide vulcanization compound which does not contain a zinc compound such as a zinc oxidant and contains sulfur powder as a co-crosslinking agent.

Examples of the organic peroxide include dicumyl peroxide and benzoyl peroxide.

The organic peroxide may generally be added in an amount of 5 to 30 phr, preferably 8 to 25 phr.

The sulfur powder may generally be added as a co-crosslinking agent in an amount of 0.05 to 2.0 phr, preferably 0.1 to 0.5 phr. When the amount of the sulfur powder is too small, it is difficult to bring about vulcanization adhesion effects between the first rubber layer and the second rubber layer. When the amount of sulfur powder is too large, it becomes necessary to reduce the peroxide amount in proportion, which increases the compression set of the vulcanized rubber and makes it difficult to attain necessary fatigue properties.

In addition to the organic peroxide, the EPDM compound for the first rubber compound generally contains auxiliary materials for compounding the peroxide vulcanization compound such as carbon black, paraffin process oil and stearic acid or the like.

It is desirable to substitute a portion of the amount of carbon black (80 to 180 phr) ordinarily added with a combination of specific talc and calcium carbonate for increasing the volume of intrinsic resistivity of the first rubber layer. Specific talc having an average particle size of about 1 to 5 μm and an aspect ratio of about 5 to 20 (for example, "Mistron Vapor" produced by Nihon Mistron Co., Ltd. having an average particle size of 2.3 μm and an aspect ratio of 10.0) is desired. The carbon black is contained in the EPDM as a filler so as to fill the gaps among the chains of the EPDM.

It is desired that the substitution amount of the carbon black is generally 90 wt % or lower, preferably 70 wt % or lower, more preferably 50 wt % or lower based on the above ordinarily added amount; and the amount of carbon black is adjusted to be 35 wt % or lower, preferably 30 wt % or lower in the EPDM compound. When the substituted amount is too large, the amount of carbon black decreases in proportion, which makes it difficult to maintain mechanical strength. When the amount of carbon black exceeds 40 wt %, on the other hand, a predetermined large intrinsic resistivity cannot easily be attained.

The EPDM compound (second rubber compound) forming the second rubber layer contains a zinc compound such as a zinc oxidant and is a sulfur vulcanization compound.

Suitable sulfur vulcanization agents include sulfur-containing compounds such as 4,4'-dithiodimorpholine, sulfur, vulcanization activator (stearic acid), and optionally, added independently or together, a vulcanization accelerator and an antiscorching agent. The vulcanization accelerator is selected from the group consisting of sulfonamides, thiurams and thiazoles, and are used singly or in combination. The antiscorching agent is selected from the group consisting of organic acid such as phthalic anhydride, salicylic acid and benzoic acid and are used singly or in combination, and nitroso compound such as N-nitrosodiphenylamine, N-(cyclohexylthio)-phthalimide, sulphoneamide derivative, diphenylurea, are used singly or in combination.

The sulfur-containing compound and sulfur may be added in an amount of 1 to 5 phr and 0.1 to 2 phr, respectively.

In addition to the sulfur vulcanization agent, auxiliary materials may be incorporated in the blending formulation for the sulfur vulcanization compound such as carbon black, process oil and stearic acid.

Incidentally, in the second rubber compound similar to the first rubber compound, it is desired to substitute a portion of the ordinarily added amount of carbon black with talc/calcium carbonate with an aim at increasing an intrinsic resistivity and maintaining mechanical strength (referring to B and C in Table 2).

A water hose is manufactured from the above first and second rubber compounds as follows:

First and second rubber material are prepared for extrusion into a hose by adding the above-described auxiliary materials to the EPDM (rubber polymer) and kneading the resulting mixture, respectively. A water hose is manufactured by extruding the first rubber material into an inner tube 11 by a general-purpose extruder, forming a reinforcing yarn layer 13 by knitting a nylon yarn or the like, extruding the second rubber compound into an outer tube 15 and then carrying out vulcanization by using steam heating, mold heating, microwave heating, hot air heating and fluidized bed heating either singly or in combination. The extrusion of inner and outer tubes and a knitting method of the reinforcing yarn layer are carried out by a conventional technique as disclosed in U.S. Pat. No. 4,472,126.

The reinforced rubber hose so manufactured has, as described in the following Examples, good adhesion between the first rubber layer and the second rubber layer and moreover, the rubber layer of the rubber compound having a portion of carbon black substituted with specific talc and calcium carbonate has an increased volume intrinsic resistivity without causing deterioration in mechanical properties.

The reinforced rubber hose of the present invention has the above-described constitution so that it brings about effects and advantages as described below.

In a rubber layer structure provided with a first rubber layer in contact with a liquid surface and a second rubber layer in contact with the first rubber layer, the first rubber layer is formed of a peroxide vulcanization first rubber compound which mainly includes EPDM, does not contain a zinc compound such as zinc oxidant and contains sulfur powder as a co-crosslinking agent and the second rubber layer is formed of a sulfur vulcanization second rubber compound which mainly includes EPDM and contains a zinc compound such as zinc oxidant. With this configuration, an adhesion of practical strength can be attained between the first rubber layer and the second rubber layer which contain different types of vulcanization compounds.

Accordingly, when the first rubber layer in contact with a liquid surface is formed of a peroxide vulcanization EPDM compound, vulcanization adhesion of practical strength can be attained even if the second rubber layer, in direct contact with the first rubber layer, is formed of a sulfur vulcanization compound.

It is, therefore, unnecessary to form both the first rubber layer and the second rubber layer from a peroxide vulcanization compound, and the amount of costly organic peroxide can be reduced.

When a portion of carbon black is substituted by a specific talc and calcium carbonate, a volume intrinsic resistivity can be increased without causing substantial deterioration in mechanical properties of the vulcanized rubber.

When the rubber layer structure of the present invention is made into a water hose or the like and an electrolytic liquid is passed therethrough, a high intrinsic resistivity tends to prevent the introduction of electricity and therefore, electrochemical reaction between the hose and the electrolytic liquid (cooling water) is not accelerated.

EXAMPLES

The following is a description of Examples confirming the advantages of the present invention.

<A>Testing Method

Tests on the below-described various physical properties were carried out using rubber compounds prepared in accordance with the blending formulations as shown in Table 1 (examples of peroxide vulcanization compound) and Table 2 (examples of sulfur vulcanization compound).

Incidentally, a polymer (EPDM) used had a propylene content of 45 wt %, an iodine value of 15 and a Mooney viscosity ($ML_{1+4}$ 100° C.) of 100 and contained ethylidene norbornene as a third component.

As calcium carbonate, "HAKUENKA CC" (produced by SHIRAISHI KOGYOSHA, LTD.) was employed.

(1) Ordinary Physical Properties

In accordance with JIS K 6301 (specimen: Dumbbell specimen No. 3), spring hardness, $H_S$ (JIS A), tensile strength: $T_B$ (Mpa) and elongation: $E_B$ (%) were measured.

(2) Test on Compression Set

A test on the compression set was carried out under heat treatment conditions at 120° C. for 22 hours in accordance with JIS K 6301 and the compression set ($C_s$; %) was determined.

(3) Volume intrinsic resistivity

Volume intrinsic resistivity was measured in accordance with JIS K 6911.

(4) Elution Amount of Zinc

In 100 ml of LLC, a 10 g rubber piece was dipped at 23° C. for 48 hours. After the rubber piece was picked up, the liquid was subjected to centrifugal separation. The Zn contents of the supernatant and precipitate (dissolved in HCL) were measured by atomic absorption analysis and from both measurements, the zinc content was determined.

(5) Adhesion Test

A double-layered laminate was prepared by combining, as shown in Table 3, two unvulcanized sheets, each 2 mm in thickness, which had been prepared respectively from the compositions shown in Tables. After press vulcanization at 160° C. for 25 minutes, the double-layered laminate was cut into test pieces (each, 10 mm in width×100 mm in length) Adhesive strength (N/cm) of each of the test pieces was determined by a 180° peeling test in each temperature atmosphere under the conditions of 50 mm/min. according to JIS K 6256.

<B>Test Results and Evaluation

Test results (except for adhesive strength) are shown in Tables 1 and 2 and those of the adhesive strength are shown in Table 3.

From the test results, it can be seen that vulcanized rubber formed of a peroxide vulcanization rubber compound without the addition of the present invention shows ordinary physical properties very similar to those of a sulfur vulcanization rubber compound containing zinc oxidant.

Incidentally, it has been found in the case of the peroxide vulcanization compound, even an increase in the amount of sulfur, which is a co-crosslinking agent, to 0.5 or greater hardly causes a change in mechanical properties (referring to rubber compounds examples 2 to 4 and 5 to 7), while in the case of the sulfur vulcanization compound, sufficient mechanical properties cannot be obtained easily by the use of specific talc (Mistron Vapor) (referring to rubber compound examples B and C) alone.

From the results of the test on compression set, it has been shown that the peroxide vulcanization compound has much greater fatigue properties compared with the sulfur vulcanization compound and, in particularly, the fatigue properties become excellent when the amount of a peroxide exceeds 10 parts. It has also been found that in the peroxide vulcanization compound, an amount of sulfur powder, which is a co-crosslinking agent, does not affect the compression set.

From the results of the measurement of the volume intrinsic resistivity, it has been found that the substitution of a portion of carbon black (CB) by the specific talc/calcium carbonate combination, thereby reducing the CB content in the rubber compound to 35 wt % or lower bring about a drastic increase in the volume intrinsic resistivity (especially, referring to C and D in Table 2).

From the results of the test on adhesion, it has been found that amounts of a peroxide and sulfur hardly affect the adhesion and that any laminate exhibits practical adhesive strength not lower than 30 N/cm.

TABLE 1

| Peroxide vulcanization compound | | 1 | 2 | 3 | 4 | 5 | 6 | 7 |
|---|---|---|---|---|---|---|---|---|
| Composition | Polymer | 100 | | | | | | |
| | SRF carbon | 90 | | | | | | |
| | Mistron Vapor | 30 | ← | ← | ← | ← | ← | ← |
| | Calcium carbonate | 30 | | | | | | |
| | Process oil | 50 | | | | | | |
| | Stearic acid | 2 | | | | | | |
| | Peroxide | 9 | 13 | 13 | 13 | 15 | 15 | 15 |
| | Sulfur powder | 0.2 | 0.2 | 0.4 | 0.6 | 0.2 | 0.4 | 0.6 |
| Hardness $H_s$ (JIS A) | | 64 | 63 | 64 | 63 | 65 | 64 | 63 |
| Tensile strength $T_B$ (Mpa) | | 10.5 | 11.4 | 13.5 | 14.0 | 12.2 | 13.6 | 13.6 |
| Elongation $E_B$ (%) | | 510 | 460 | 470 | 510 | 440 | 450 | 450 |
| Compression set $C_s$ (%) | | 23 | 14 | 12 | 13 | 13 | 14 | 14 |
| Volume intrinsic resistivity ($\Omega \cdot cm$) | | $10^6$ | $10^6$ | $10^6$ | $10^6$ | $10^5$ | $10^5$ | $10^6$ |
| Elution amount of Zn (ppm) | | 0 | 0 | 0 | 0 | 0 | 0 | 0 |

TABLE 2

| Sulfur vulcanization compound | | A | B | C | D | E | F | G |
|---|---|---|---|---|---|---|---|---|
| Composition | Polymer | 100 | 100 | 100 | 100 | 100 | 100 | 100 |
| | SRF carbon | 70 | 80 | 80 | 100 | 105 | 135 | 140 |
| | Mistron Vapor | 30 | 30 | 60 | — | — | — | — |
| | Calcium carbonate | 30 | 30 | — | — | — | — | — |
| | Process oil | 40 | 50 | 50 | 72.5 | 90 | 80 | 90 |
| | Stearic acid | 3 | 3 | 3 | 2 | 2 | 3 | 3 |
| | Zinc oxidant | 5 | | | | | | |
| | Sulfur powder | 0.6 | | | | | | |
| | Vulcanization accelerator | 2.75 | ← | ← | ← | ← | ← | ← |
| | Sulfur-containing compound | 2 | | | | | | |
| | Antiscorching agent | 0.2 | | | | | | |
| Hardness $H_s$ (JIS A) | | 64 | 65 | 62 | 68 | 63 | 76 | 74 |
| Tensile strength $T_B$ (Mpa) | | 13.7 | 13.0 | 5.6 | 14.6 | 15.0 | 13.2 | 14.1 |
| Elongation $E_B$ (%) | | 510 | 480 | 360 | 480 | 520 | 360 | 420 |
| Compression set $C_s$ (%) | | 52 | 50 | 55 | 45 | 42 | 57 | 51 |
| Volume intrinsic resistivity ($\Omega \cdot cm$) | | $10^{13}$ | $10^6$ | $10^6$ | $10^4$ | $10^4$ | $10^3$ | $10^3$ |
| Elution amount of Zn (ppm) | | 15 | 14 | 17 | 19 | 20 | 30 | 32 |

TABLE 3 unit: N/cm

| First layer Second layer | 1 | 2 | 3 | 4 | 5 | 6 | D | F |
|---|---|---|---|---|---|---|---|---|
| B | 33 | 31 | 30 | 31 | 31 | 30 | — | — |
| D | — | — | — | — | — | — | 58 | — |
| F | — | — | — | — | — | — | — | 44 |

What is claimed is:

1. A rubber layer structure comprising:
   a first rubber layer having a first liquid facing surface and second surface, said first rubber layer comprising in a pre-vulcanized state a peroxide vulcanizable composition comprising (a) EPDM, (b) a sulfur co-crosslinking agent, and reinforcing organic fillers (c1) carbon black in an amount of 80–180 phr, (c2) calcium carbonate, and (c3) talc having an average particle size of about 1 to 5 μm and an aspect ratio of about 5 to 20, with the proviso that said first rubber layer does not contain zinc; and
   a second rubber layer in contact with said second surface, said second rubber layer comprising in a pre-vulcanized state a sulfur vulcanizable composition comprising (a) EPDM and (b) a zinc compound, wherein said first rubber layer is adhered to said second rubber layer by vulcanization.

2. The rubber layer structure of claim 1, wherein less than or equal to 90 wt % of said carbon black is replaced by said calcium carbonate and talc.

3. The rubber layer structure of claim 1, wherein the zinc compound in the sulfur vulcanizable composition is a zinc oxidant.

4. The rubber layer structure of claim 1, wherein said peroxide vulcanizable composition further comprises dicumyl peroxide or benzoyl peroxide as an organic peroxide.

5. The rubber layer structure of claim 4, wherein said organic peroxide is added in an amount of 5 to 30 phr.

6. The rubber layer structure of claim 5, wherein said organic peroxide is added in an amount of 8–25 phr.

7. The rubber layer structure of claim 1, wherein said sulfur in said peroxide vulcanizable composition is added as a co-crosslinking agent in an amount of 0.05 to 2.0 phr.

8. The rubber layer structure of claim 1, wherein said sulfur in said peroxide vulcanizable composition is added as a co-crosslinking agent in an amount of 0.1 to 0.5 phr.

9. A multiple-layer rubber hose comprising:
   an inner tube through which a liquid passes, said inner tube comprising in a pre-vulcanized state a peroxide vulcanizable composition, said peroxide vulcanizable composition comprising (a) EPDM, (b) sulfur as a co-crosslinking agent, and reinforcing organic fillers (c1) carbon black in an amount of 80–180 phr, (c2) calcium carbonate, and (c3) talc having an average particle size of about 1 to 5 µm and an aspect ratio of about 5 to 20, with the proviso that said peroxide vulcanizable composition does not contain zinc; and an outer tube in contact with said inner tube, said outer tube comprising in a pre-vulcanized state a sulfur vulcanizable composition, said sulfur vulcanizable composition comprising (a) EPDM and (b) a zinc compound, wherein said inner tube and outer tube are adhered together by vulcanization.

10. The multiple layer rubber hose of claim 9, wherein less than or equal to 90 wt % of said carbon black is replaced by said calcium carbonate and talc.

11. The multiple layer hose of claim 9, wherein the amount of said carbon black in said inner tube is 35 wt % or less of the total weight of said inner tube before vulcanization.

12. The multiple-layer rubber hose of claim 9, further comprising a reinforcing yarn layer of a mesh structure interposed between said inner and outer tubes.

13. The multiple-layer rubber hose of claim 12, wherein the yarn layer is formed of 66-nylon, aramid fibers or rayon fibers and has a knitting angle of 50–60°.

14. A rubber layer structure comprising:
a first rubber layer having a first liquid facing surface and second surface, said first rubber layer comprising in a pre-vulcanized state a peroxide vulcanizable composition comprising (a) EPDM, (b) a sulfur co-crosslinking agent, and reinforcing organic fillers (c1) carbon black, (c2) calcium carbonate, and (c3) talc having an average particle size of about 1 to 5 µm and an aspect ratio of about 5 to 20, with the proviso that said first rubber layer does not contain zinc; and
a second rubber layer in contact with said second surface, said second rubber layer comprising in a pre-vulcanized state a sulfur vulcanizable composition comprising (a) EPDM and (b) a zinc compound, wherein said first rubber layer is adhered to said second rubber layer by vulcanization; and wherein the amount of said carbon black in said first rubber layer is 35 wt % or less of the total weight of said first rubber layer before vulcanization.

15. The rubber layer structure of claim 12, wherein the zinc compound in the sulfur vulcanizable composition is a zinc oxidant.

16. The rubber layer structure of claim 12, wherein said peroxide vulcanizable composition further comprises dicumyl peroxide or benzoyl peroxide as an organic peroxide.

17. The rubber layer structure of claim 14, wherein said organic peroxide is added in an amount of 5 to 30 phr.

18. The rubber layer structure of claim 15, wherein said organic peroxide is added in an amount of 8 to 25 phr.

19. The rubber layer structure of claim 12, wherein said sulfur in said peroxide vulcanizable composition is added as a co-crosslinking agent in an amount of 0.05 to 2.0 phr.

20. The rubber layer structure of claim 12, wherein said sulfur in said peroxide vulcanizable composition is added as a co-crosslinking agent in an amount of 0.1 to 0.5 phr.

21. A rubber layer structure comprising:
a first rubber layer having a first liquid facing surface and second surface, said first rubber layer comprising in a pre-vulcanized state a peroxide vulcanizable composition comprising (a) EPDM, (b) a sulfur co-crosslinking agent, and reinforcing organic fillers (c1) carbon black, (c2) calcium carbonate, and (c3) talc having an average particle size of about 1 to 5 µm and an aspect ratio of about 5 to 20, with the proviso that said first rubber layer does not contain zinc; and
a second rubber layer in contact with said second surface, said second rubber layer comprising in a pre-vulcanized state a sulfur vulcanizable composition comprising (a) EPDM and (b) a zinc compound, wherein said first rubber layer is adhered to said second rubber layer by vulcanization; and
wherein said rubber layer structure further comprises a mesh structured reinforcing yarn layer interposed between said first rubber layer and said second rubber layer, wherein said yarn layer is formed of 66-nylon, aramid fibers or rayon fibers, and has a knitting angle of 50–60°.

* * * * *

UNITED STATES PATENT AND TRADEMARK OFFICE
CERTIFICATE OF CORRECTION

PATENT NO. : 6,071,582
APPLICATION NO. : 08/998483
DATED : June 6, 2000
INVENTOR(S) : Tangiku et al.

Page 1 of 1

It is certified that error appears in the above-identified patent and that said Letters Patent is hereby corrected as shown below:

Column 7, line 59, the word "organic" should read --inorganic--.

Column 9, line 3, the word "organic" should read --inorganic--.

Column 9, line 33, the word "organic" should read --inorganic--.

Column 10, line 25, the word "organic" should read --inorganic--.

Signed and Sealed this

Fifth Day of June, 2007

JON W. DUDAS
*Director of the United States Patent and Trademark Office*